United States Patent [19]

Coppock

[11] 4,430,964
[45] Feb. 14, 1984

[54] FLUID INDUCTION SYSTEM FOR INTERNAL COMBUSTION ENGINE

[76] Inventor: Kenneth M. Coppock, 8025 18th Ave., N.E., Seattle, Wash. 98115

[21] Appl. No.: 276,472

[22] Filed: Jun. 23, 1981

[51] Int. Cl.$^3$ ............................................. F02B 19/00
[52] U.S. Cl. ............................... 123/25 B; 123/25 E; 123/25 L; 123/198 A
[58] Field of Search ............. 123/198 A, 25 R, 25 A, 123/25 E, 25 L, 25 B

[56] References Cited

U.S. PATENT DOCUMENTS

| | | | |
|---|---|---|---|
| 1,220,039 | 3/1917 | White | 123/557 |
| 1,983,357 | 12/1934 | Falconer | 123/25 F |
| 3,141,447 | 7/1964 | Jernigan | 123/25 B |
| 3,537,434 | 11/1970 | Herpin | 123/198 A |
| 3,911,871 | 10/1975 | Williams et al. | 123/25 K |
| 3,989,017 | 11/1976 | Reece | 123/536 |
| 4,046,119 | 9/1977 | Perry | 123/25 B |
| 4,056,087 | 11/1977 | Boyce | 123/25 K |
| 4,078,527 | 3/1978 | Yasuda | 123/25 B |
| 4,166,435 | 9/1979 | Kiang | 123/25 B |
| 4,208,989 | 6/1980 | Hart | 123/25 B |
| 4,294,219 | 10/1981 | Rowe | 123/557 |
| 4,346,675 | 8/1982 | Holliday | 123/25 B |

*Primary Examiner*—Craig R. Feinberg
*Attorney, Agent, or Firm*—Klarquist, Sparkman, Campbell, Leigh & Whinston

[57] ABSTRACT

Fuel additive fluid is induced at two locations relative to the throttle valve of an atomizing carburetor. A first stream of fluid is induced at an upstream position located at or upstream of the throttle valve such that the throttle valve can be closed to block the passageway from the upstream position to the combustion chamber and thereby regulate the flow of fluid therebetween. A second stream of additive fluid is induced at a position downstream of the throttle valve, from which position there is an uninterrupted passageway to the combustion chamber. The fluid is delivered to both positions from a single compartment of a heat exchange device wherein waste engine heat is transfered to the fluid prior to induction.

12 Claims, 2 Drawing Figures

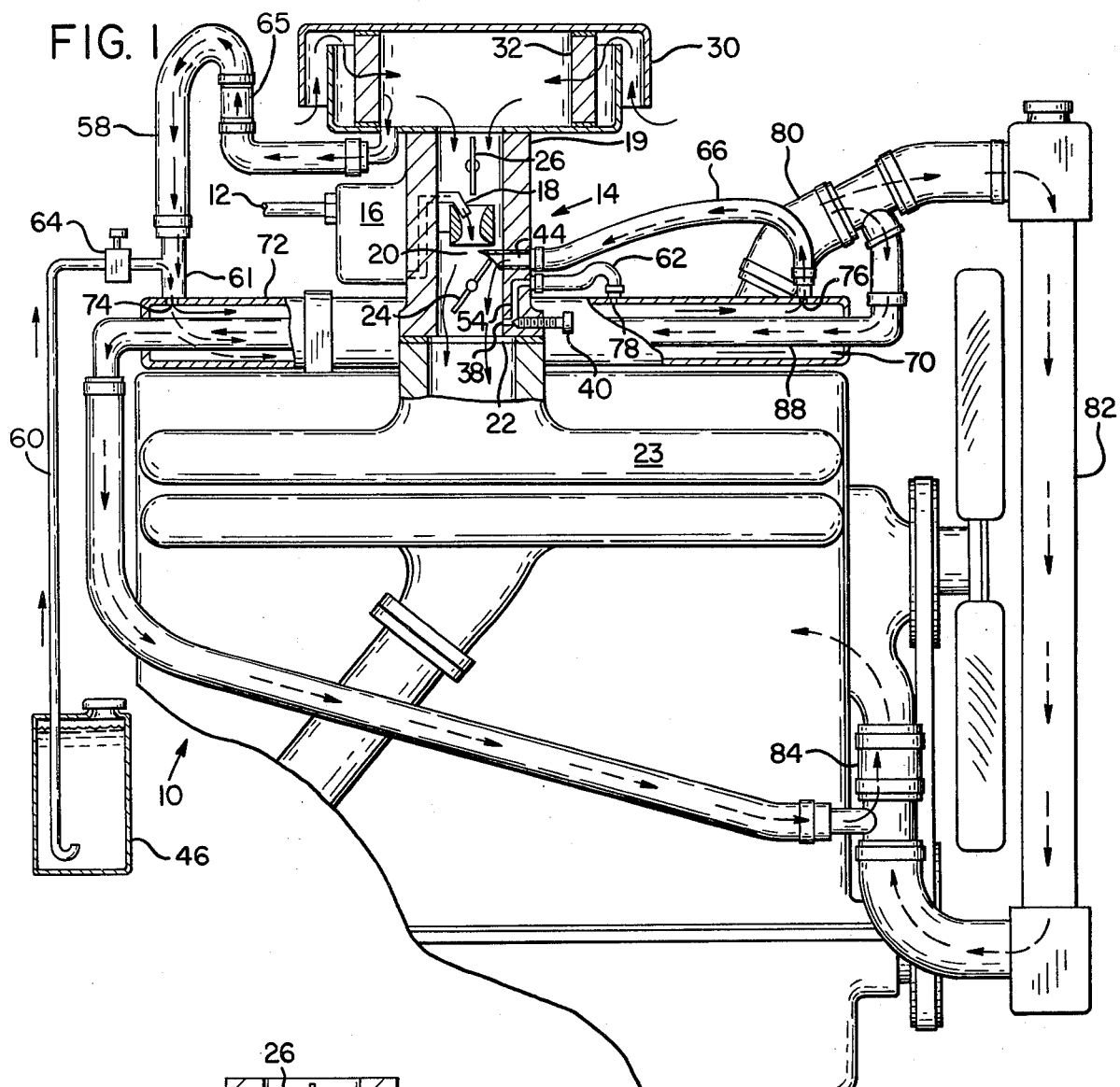

FLUID INDUCTION SYSTEM FOR INTERNAL COMBUSTION ENGINE

SUMMARY OF THE INVENTION

The present invention relates to carburetion systems for internal combustion engines. More specifically, it relates to the induction of water and other fuel additive fluids into the fuel-air mixture which enters such an engine from a carburetor.

It has long been recognized that performance of an internal combustion engine can be improved if certain additive fluids are added to the fuel mixture entering the combustion chamber. In particular, the addition of small amounts of water to the fuel mixture is recognized as useful in controlling air pollution, increasing the operating efficiency of the engine and reducing fuel consumption.

It has also been reported that combustion is more complete when water vapor and certain other fluids are added to the fuel mixture. As a result, there is less build-up of carbon and other deposits inside the combustion chamber when certain additive fluids are induced.

If the introduction of water and other fluids into the fuel mixture is to improve engine performance, the rate of fluid induction must be regulated in response to changes in engine operation. For example, it is advantageous to add water to the fuel mixture of an engine used to power an automotive vehicle. Because such an engine will operate through a range of speeds from idling to high rpm operation, some provision must be made to adjust the flow of water as a function of engine speed. Such an adjustment is necessary because the engine requires a relatively large amount of water for efficient high-speed operation. But, an engine that receives too much water when idling will run roughly and "ping".

A number of different methods have been used to regulate the addition of fuel additives. U.S. Pat. No. 4,078,527 (Yashuda), describes the use of a flow-regulator valve having a single hole that serves as a negative-pressure inlet and water outlet. Water from a reservoir passes through the valve on its way to the interior of a carburetor. The valve contains a number of moving parts and must be remotely sensitive to conditions inside the carburetor.

Similarly, U.S. Pat. Nos. 3,911,871 (Williams et al), and 4,046,119 (Perry) show the use of vacuum actuated valves to regulate the flow of a fluid additive directly into the intake manifold of an automotive engine.

While these systems may be effective in regulating flow, each employs a moderately complex assembly of moving parts which must be maintained and are subject to mechanical failure.

It has now been discovered that fluid additive induction can be regulated effectively without the use of vacuum actuated valves or any other device with moving parts. This is accomplished by providing fluid induction ports at two positions in the fuel system, one at or upstream of the carburetor throttle valve, and another located downstream thereof.

Preferably the two ports are connected to a single compartment containing the additive fluid. With this arrangement, closing the throttle valve causes negative pressure downstream thereof to draw fuel from the carburetor throat through the upstream induction port and into the compartment. This fuel flows from the compartment and is reintroduced into the carburetor downstream of the throttle valve through the downstream induction port. The ports are connected to the compartment at spaced locations so that fuel flowing therethrough is mixed with additive fluid before it is introduced.

The existing carburetor throttle valve thus automatically regulates the flow of additive fluid into the combustion chamber, but does not entirely stop that flow, even when closed, because a certain minimum flow of additive will always be inducted through the downstream induction port whenever the engine is in operation.

The compartment is formed integrally with a heat exchange device so that the additive fluid may be preheated by waste engine heat prior to induction into the combustion chamber.

An object of the invention is to provide a fluid induction system for an internal combustion engine having an atomizing carburetor.

Another object is to provide such an induction system which is responsive to demands of the engine so that an optimum amount of additive fluid is supplied to the combustion chamber regardless of engine speed.

An additional object is to provide such an induction system which is simple, easy to maintain, does not substantially increase the mechanical complexity of the engine.

A particular object is to provide such a system which includes no parts which move during operation of the engine, except for parts that are required for normal operation of the carburetor.

A further object is to provide such an induction system which may be easily added to an existing engine.

Yet a further object is to provide a system which uses waste heat energy from an internal combustion engine to preheat the fluid to be induced and to vaporize liquid fluids prior to induction.

These and other objects and features of the present invention will be apparent from the drawings and detailed description.

BRIEF DESCRIPTION OF THE DRAWING

FIG. 1 is a vertical, elevational view of an internal combustion engine with portions of the fuel system cut away to show internal details; and FIG. 2 is an enlarged vertical sectional view of a carburetor shown in FIG. 1.

DETAILED DESCRIPTION

As shown in the drawing figures, the present invention is an apparatus for inducting a controlled amount of a fuel additive fluid into the combustion chamber of an internal combustion engine 10. The fuel delivery system for the engine includes a fuel inlet line 12 which extends between a remote fuel tank and a conventional atomizing carburetor 14.

The carburetor has a float chamber 16 containing a float which regulates the flow of fuel into the chamber 16. A nozzle 18 delivers fuel from the chamber 16 into a fuel delivery tube 19 which defines the throat 20 of the carburetor 14. The fuel delivery tube 17 has an outlet 22 in communication with the combustion chamber. In the illustrated embodiment, the outlet 22 connects to an intake manifold 23.

A throttle valve 24 and choke valve 26 operate in a conventional manner to regulate the flow of air and fuel into the combustion chambers of the engine 10. A conventional air cleaner 30 is located on top of the inlet of the throat 20 of the carburetor 14 and includes a conventional filter element 32.

The illustrated carburetor 14 includes a pilot system which provides a secondary source of fuel and air to the carburetor at a location below throttle valve 24. The pilot system has an outlet 38 through which flow is regulated by a pilot mixture regulating screw 40. Fuel for the pilot mixture is provided from the flow chamber 16. Air for the pilot system is provided from the air cleaner 30, but in an unconventional manner as is described below.

It will be understood that the one conventional carburetor illustrated, is merely an example. The design of this carburetor could be varied to include acceleration systems and added nozzles. In addition, up draught and cross draft carburetors may be used instead of the down draught carburetors shown in FIGS. 1 and 2.

The system for inducting fuel additive fuel includes an upstream additive passageway 44 which connects to the throat 20 of the carburetor 14. Additive fluid flows from a reservoir 46 to the passageway 44 and is induced into the throat 20. The fluid is induced at an upstream inducting position 47 which is located relative to the throttle valve 24 such that the valve can be closed to block the passageway for additive fluid from the passageway 44 to the outlet 22. The position of the throttle valve 24 thus regulates the flow of additive fluid from an upstream inducting position 47 into the combustion chamber engine 10.

The throttle valve is constructed to precisely control the flow of additive fluid through the passgeway 44.

As shown most clearly in FIG. 2, the passageway 44 is defined by an upstream inducting tube 48 which extends radially into the throat 20 and terminates at an inner end 50 which conforms in shape to the arc traced by the throttle valve 24. When the throttle valve is located intermediately of its fully opened and fully closed positions, it effectively varies the orifice of the tube 48 and thereby regulates flow therethrough without the need of a remote, vacuum-sensitive valve.

This arrangement alone is a substantial improvement over the prior art. But, the greatest engine efficiency might not be achieved since the additive fluid would be entirely blocked when the throttle valve 24 is closed, e.g., when the engine is idling. Therefore, means are provided for inducting a second stream of additive fluid into the combustion chambers from a location downstream of the throttle valve 24. This second stream is introduced through a downstream additive passageway 54 which connects to the interior of the fuel delivery tube 19 or directly to the intake manifold at a downstream inducting position 56.

In the illustrated embodiment, the downstream additive passageway 54 is a part of the pilot system. The passageway 54 connects with the reservoir 46 so that additive fluid from the reservoir is carried into the combustion chambers via the outlet 38. Since the outlet 38 is located below the throttle valve 24, the throttle valve cannot block the flow of additive fluid from the reservoir 46 to the combustion chambers.

The passageways 44, 54 are both substantially smaller in diameter than the carburetor throat 20 so that the volume of additive fluid induced in the throat 20 is less than the volume of the fuel mixture.

Air for the pilot mixture is also supplied through the passageway 54. This air is obtained through a hose 58 which extends from the air cleaner 30. Air in hose 58 is merged with additive fluid in a hose 60 which extends from the reservoir 46. The filtered air and additive fluid are merged in a hose 61. The resulting mixture is delivered to the downstream additive passageway 54 by a hose 62 which connects to the hose 61. A needle valve 64 may be manually set to establish the most preferred ratio of air to additive fluid.

A one-way valve 65 is included in the hose 58. This valve prevents fluids from flowing from the tube 61 into the air cleaner 30, which could otherwise occur whenever the engine is turned off after a period of operation.

As seen in FIG. 1, the illustrated embodiment also includes a tube 66 which receives the mixture of additive fluid and air from the tube 61. The same fluid is thus found in the upstream and downstream passageways 44, 54 when induction is occurring at both the upstream and downstream inducting positions inside the tube 17.

In the most preferred embodiment, the tubes 62 and 66 are separately connected, at spaced locations, to a fluidtight compartment 70 defined by a jacket 72. The compartment has an inlet 74 which connects to the mixing tube 61, and a primary outlet 76 which is connected by the hose 66 to the upstream additive passageway. A secondary outlet 78 from the compartment 70 is connected to the downstream additive passageway by the hose 62. The compartment 70 receives a stream of additive fluid and air from the mixing tube 61.

The apparatus of the present invention further comprises a heat exchange device which can be used to transfer waste engine heat to the fuel additive fluid. If the fluid is a liquid, such as water, the heat exchanger can be used to vaporize the liquid additive before it is inducted.

The illustrated engine has a conventional liquid cooling system wherein liquid coolant, heated by the engine, is withdrawn through a hose 80 which connects to a radiator 82. The liquid coolant is cooled inside the radiator and returned to the engine through a hose 84. This cooling system is used to an advantage by diverting a flow of the heated coolant from the hose 80 and through a heat exchange tube 88 which extends through the compartment 70.

The inlet 74 and outlets 76, 78 are positioned so that additive fluid and air flow countercurrently to coolant inside the tube 88 so that the temperature of the additive fluid progressively increases as it flows from the inlet to the primary outlet, and heat from the coolant vaporizes the additive fluids. Coolant travelling through the tube 88 is cooled by heat transfer to the additive fluid mixture and is returned to the hose 84 for recirculation through the engine.

Water is the additive fluid most preferred for induction using the above described apparatus. Its benefits to engine operation are well-documented, and requirements for its use are well known. Other additive fluids include low molecular weight, combustible organic substances such as methanol or ethanol. Such substances can be used alone or with water to improve fuel combustion characteristics.

Operation of the device is completely automatic, and as will be understood from the foregoing description. The only moving parts of the system are those which are already present in the conventional carburetor. The vacuum which is present inside the throat 20 automatically causes the induction of fluids through the various passages connecting to the throat 20.

When the engine is to be operated at high speed, the throttle valve is opened so that a stream of fuel additive fluid is induced through the passageway 44 to an upstream inducting position 47 located in the tube 17. Due to the position of the throttle, the fluid inducted at this upstream position travels downwardly into the intake manifold 23.

If the engine is operated at moderate speed, the throttle valve 24 will partially block the orifice 50 of the upstream inducting tube 48 so that there will be a reduced flow of additive fluid to the upstream inducting position 47. This reduces the flow of the additive fluid from the upstream inducting position to the intake manifold.

When the throttle valve 24 is closed, as shown in FIG. 2, the passageway for additive fluid from the upstream inducting position 47 to the delivery tube outlet 22 is blocked so that additive fluid cannot flow from the upstream inducting position into the manifold 23. This is the condition which exists when the engine is idling.

Regardless of engine speed, a stream of fuel additive fluid is inducted to the downstream inducting position 56 through the outlet 38. This is because the passageway from the downstream inducting position to the combustion chamber is unobstructed and is not blocked by closing the throttle valve 24.

Whenever the throttle is fully closed, flow through the tube 66 will reverse due to negative pressure inside the compartment 70. This negative pressure exists because the compartment is connected to the throat 20 below the throttle 24 by the tube 62. Thus, when the engine idles, fuel and air are drawn from inside the tube 17 at the upstream inducting position 47, through the upstream additive passageway 44, into the compartment 70. From the compartment 70, the fuel mixture travels through the downstream passageway 54 and back into the interior of the tube 17 at the downstream inducting position 56.

The wide spacing of the outlets 76, 78 insures that this fuel mixture does not avoid contact with the additive fluid. Since the fuel mixture flowing from the outlet 76 to the outlet 78 passes through a substantial volume of the compartment 70, the fluid additive therein combines with the fuel mixture and continues to enter through the passageway 54 despite the reversal of flow through the hose 66.

Having illustrated and described a preferred embodiment of my invention it will be apparent to those skilled in the art that modifications and changes may be made without departing from my invention in its broader aspects. For example, a different heat exchanger arrangement could be used to adopt the invention for use on an air-cooled engine. Therefore, the scope of the invention should only be defined by the following claims.

I claim:

1. A carburetor for an internal combustion engine comprising:
    a fuel delivery tube having an outlet which connects to a combustion chamber of an internal combustion engine;
    means for providing a stream of fluid fuel and air inside the tube;
    a throttle valve inside the tube;
    upstream inducting means connected to the fuel delivery tube for inducting a first stream of fuel additive fluid into the tube at such a position that when the throttle valve is closed the passageway for additive fluid from the upstream inducting means to the delivery tube is blocked;
    downstream inducting means connected to the delivery tube for inducting a second stream of the fuel additive fluid into the delivery tube, the second stream being inducted at a position downstream of the throttle valve so that there is a substantially uninterrupted passageway from the downstream inducting means to the combustion chamber;
    additive fluid reservoir means connected to the upstream and downstream inducting means;
    a heat exchange tube connected to the engine in such a manner that a stream of heated engine coolant flow therethrough;
    a jacket extending along the tube so that a fluidtight compartment is defined between the tube and the jacket, the compartment having an inlet and a primary outlet opening at spaced locations and a secondary outlet opening located therebetween, the inlet and outlets being positioned so that the fuel additive fluid flows countercurrently to the coolant whereby temperature of the additive fluid progressively increases as it flows from the inlet to the primary outlet;
    means connecting the reservoir to the inlet;
    means connecting the primary outlet to the upstream inducting means; and
    means connecting the secondary outlet to the downstream inducting means.

2. The apparatus of claim 1 further comprising:
    an air cleaner for filtering the air which enters the fuel delivery tube;
    contact means, connected between the air cleaner and the inducting means, for combining filtered air with a liquid additive contained in the reservoir; and
    a one-way valve located between the air cleaner and the contact means to prevent liquid additive from backing up into the air cleaner when the engine is turned off after a period of operation.

3. Apparatus for inducting a controlled amount of a fuel additive fluid into the combustion chamber of an internal combustion engine which receives fuel from an atomizing carburetor having a fuel delivery tube with a throttle valve, the apparatus comprising:
    a heat exchange tube which connects to an internal combustion engine in such a manner that a stream of heated engine coolant flows therethrough;
    a jacket which defines a fluid-tight compartment extending along the tube, the compartment having an inlet, a primary outlet and a secondary outlet at spaced locations, the jacket being constructed such that heat energy generated in an internal combustion engine is transferred into the compartment;
    a reservoir for a fuel additive fluid;
    means for delivering a stream of the fuel additive fluid from the reservoir to the inlet so that the fuel additive fluid flows countercurrently to the coolant whereby temperature of the additive fluid progressively increases as it flows from the inlet to the primary outlet;
    means for defining a passageway from primary outlet to a location inside a fuel delivery tube of a carburetor at the level of a butterfly throttle valve located in the tube; and
    means defining a passageway from the secondary outlet to a location inside the fuel delivery tube at a level downstream of the throttle valve.

4. The apparatus of claim 3 wherein each passageway has a cross-sectional area less than the passage defined by the fuel delivery tube.

5. The apparatus of claim 3 further comprising a valve connected between the reservoir and the inlet for adjusting the rate of fluid flow into the compartment.

6. Apparatus for inducting a controlled amount of a fuel additive fluid into a combustion chamber of an internal combustion engine which receives fuel from an atomizing carburetor having a fuel delivery tube with a throttle valve and an outlet in communication with the combustion chamber, the apparatus comprising:
upstream inducting means connecting to a fuel delivery tube of a carburetor for inducting a first stream of fuel additive fluid into the tube at such a position relative to a throttle valve in the tube that, when the throttle valve is closed, the passageway for additive fluid from the upstream inducting means to the delivery tube outlet is blocked;
downstream inducting means connecting to the delivery tube for inducting a second stream of the fuel additive fluid into the delivery tube, the second stream being inducted at a position downstream of the throttle valve so that there is an uninterrupted passageway from the downstream inducting means to the combustion chamber;
additive fluid reservoir means connected to the upstream and downstream inducting means;
a heat exchange tube connected to the engine in such a manner that a stream of heated engine coolant flows therethrough,
a jacket extending along the tube so that a fluid tight compartment is defined between the tube and the jacket, the compartment having an inlet and a primary outlet opening at spaced locations and a secondary outlet opening located therebetween, the inlet and outlets being positioned so that the fuel additive fluid flows countercurrently to the coolant whereby temperature of the additive fluid progressively increases as it flows from the inlet to the primary outlet;
means connecting the reservoir to the inlet;
means connecting the primary outlet to the upstream inducting means; and
means connecting the secondary outlet to the downstream inducting means.

7. The apparatus of claim 6 wherein the upstream and downstream inducting means communicate outside the delivery tube only via the fluid tight compartment so that if flow into the delivery tube from the upstream inducting means is restricted by the throttle valve whereby fuel mixture is drawn from the delivery tube into the upstream inducting means, said mixture must pass through at least a portion of the compartment before entering the delivery tube through the downstream inducting means.

8. The apparatus of claim 6 further comprising means for merging a stream of filtered air with the fuel additive fluid before the fluid is inducted into the tube.

9. The apparatus of claim 6 wherein the inducting means has a passageway which extends radially within the delivery tube and terminates at an inner end having an arc shape that follows an arc formed by movement of an end of the throttle valve.

10. The apparatus of claim 6 wherein:
the tube and jacket are constructed so that heat from the coolant vaporizes the additive fluid;
a hose connects the reservoir to the inlet, the reservoir containing a fluid additive selected from the group consisting of water, alcohol and mixtures thereof;
a hose connects the primary outlet to the upstream inducting means which has a passageway that extends radially into the delivery tube and terminates at an inner end that conforms to the arc of the throttle valve;
a hose connects the secondary outlet to the downstream inducting means; and
means are provided for merging a stream of filtered air with the fuel additive fluid at a location upstream of the inlet to the compartment.

11. The apparatus of claim 6 where the additive fluid is selected from the group consisting of water, alcohol and mixtures thereof.

12. The apparatus of claim 11 further comprising means for vaporizing the additive fluid.

* * * * *